Patented Mar. 1, 1927.

1,619,376

UNITED STATES PATENT OFFICE.

HERMAN G. SCHANCHE, OF PHILADELPHIA, PENNSYLVANIA, ASSIGNOR TO E. I. DU PONT DE NEMOURS & COMPANY, OF WILMINGTON, DELAWARE, A CORPORATION OF DELAWARE.

LITHOPONE AND PROCESS OF INCREASING THE RESISTANCE THEREOF TO SUNLIGHT.

No Drawing.   Application filed September 5, 1923.   Serial No. 661,098.

This invention relates to the manufacture of lithopone, and more particularly it relates to a process for treatment of lithopone following the calcination step with the object of greatly improving the light resistance of the pigment.

In the manufacture of lithopone according to the prior art, the product has been very light sensitive, i. e. when exposed to the sunlight in the form of paint film and more particularly when moist, the pigment has rapidly darkened to a slate gray or even a black. Naturally this fault of the otherwise excellent pigment has greatly restricted its usefulness. In spite of the graying tendency the manufacture of lithopone has grown very rapidly which is evidence of its advantages in other properties over the competing pigments such as zinc oxide and white lead. With the correction of the discoloration, however, another wide field will be opened to lithopone as a pigment. This comprises its use in outside paints or for other purposes where the final product will receive more or less exposure to direct sunlight.

I have given a great deal of attention to the production of a lithopone definitely more light resistant than results from the process known in the prior art. I am familiar with the patents which have appeared from time to time purporting to described a process for production of light stable lithopones. Most of these cover the addition to the lithopone of some salt capable of precipitating zinc from its soluble compounds. These processes I have tried and many of them in fact appear at first to be successful.

It is true that a great many salts added to the ordinary light sensitive lithopone greatly decrease its graying. In fact almost any reagent from the shelves in the chemical laboratory will have this effect. Unfortunately, however, it is necessary to have a considerable amount of these materials present to greatly decrease the graying. It is true likewise that the pigment will not behave well in paints unless it is washed practically free from water soluble salts. When such washing treatment is applied to a lithopone prepared as indicated above the graying tendency returns. In other words, the salts referred to protect the lithopone from graying when present in very considerable amounts, but when the percentage is reduced sufficiently to make the lithopone useful as a paint pigment, the protective action disappears.

Another very serious fault of the above processes may be noted. The graying test for lithopone is usually made in the form of a water paste. The salts referred to exert their effect under these conditions. However, when the lithopone treated with a salt is made up into a linseed oil paste or is mixed with some other paint vehicle and the paint film allowed to dry, it is found that the salt no longer shows its protective action. Hence, even if it were possible to leave in the pigment enough of the added material to protect from graying in water paste, the lithopone would still be useless from the light resistance standpoint when actually applied in a paint formula.

After determining that the above mentioned processes are in general inoperative, I have been able to develop another process which actually yields a lithopone much more light resistant than various lithopones produced according to the prior art. According to my process, crude lithopone is produced in the usual manner by the mutual precipitation of barium sulfate and zinc sulfide from solutions of barium sulfide and zinc sulfate which are prepared in a manner well known in the art. The crude lithopone is filter pressed, dried, muffled, quenched in water and ground wet according to the usual practice in the manufacture of lithopone. It is then customary to wash the product with water, add a suitable amount of ultramarine or other blue pigment to obtain a satisfactory color, filter press, grind and pack.

According to my invention, however, an additional step is introduced which consists in treating the lithopone with an acid reagent. This treatment is preferably made after the lithopone has been calcined and wet ground and before it has been washed, although I do not wish to exclude treatment of the unground material or quenching the muffled pigment in an acid solution, since these treatments would obviously result in the same improvement in the light resisting properties of the lithopone and therefore possess the same advantage as the preferred method of treatment. I would also include acid treatment at any other step in the process resulting in a like advantage.

The acid used for the treatment as described above may be one of the common inorganic or organic acids such as sulfuric, phosphoric, acetic, etc. or it may be an acid salt such as sodium bisulfate, or, although with less advantage, a salt or other compound with an acid reaction such as aluminum sulfate or ordinary alum. Also a mixture of two acid reagents such as sulfuric acid and aluminum sulfate may be used to advantage. It is my practice to add enough of the acid, or salt showing an acid reaction, to the lithopone to dissolve a substantial proportion of the zinc oxide or basic zinc compounds present. By substantial proportion I mean enough to give a very definite test for zinc in the supernatant liquid after the acid treatment. If the original content of the basic zinc compounds is low the amount of zinc dissolved will be rather small. On the other hand if the original content of basic zinc compounds amounts to say 2% when calculated as zinc oxide, I may dissolve as much as half or more of these compounds.

It will be noted that my process is distinguished from those covered by the previously mentioned patents in that the compounds specified by the latter are very often described as of non-acid reaction. Also their object is often stated to be the precipitation of water soluble zinc compounds initially present. It will be seen that my process is substantially the opposite of these in that I dissolve zinc compounds instead of precipitating them. Also my reagent is definitely acid rather than non-acid.

As an example of my treatment I may take a wash tub containing 2,000 lbs. of lithopone in the form of a slurry with about 4,000 pounds of water. This lithopone has previously been calcined, quenched in water and wet ground through Buhrstone mills in the manner familiar to those versed in the art. To this wash tub full of lithopone slurry I add a sufficient amount of previously diluted sulfuric acid or of aluminum sulfate solution or of a mixture of the two, to give an acid reaction by one of the well-known indicators. This acid reaction will gradually disappear but it is my custom to add sufficient of the acid reagent so that the reaction persists after a short period of agitation. It will be understood, however, that I do not limit myself to any special amount of acid reagent inasmuch as a small amount will improve the light resistance of the product, this improvement becoming more and more marked as the amount of reagent added is increased up to a practicable maximum.

The acid treated lithopone obtained as described above is then thoroughly washed with water so that the content of water soluble salts falls below, say 0.2%. For this purpose 5–10 washings by decantation, for example, is usually sufficient. When filter pressed, dried and disintegrated in the usual manner my product will be more light resistant than that obtained by a process which is the same as mine except that the special step of acid treatment is omitted. Such comparison may be made either in water paste or in the form of a paint film. Care must be taken to test both the treated and untreated pigments under exactly the same conditions. If this is done the improvement due to my process will be obvious.

The washing of the lithopone following the acid treatment need not, of course, be continued until the water-soluble salt content falls below 0.2%, since a distinct improvement in the lithopone will be obtained if the washing be sufficient to reduce the water-soluble salt content below 0.5%, or even below 1%.

The acid treatment is generally designed to reduce the acetic acid soluble zinc content, calculated as zinc oxide, to less than 1%, and preferably to less than 0.5%.

As indicated above, it is probable that the solution of the zinc oxide or basic zinc compounds present in the calcined lithopone is responsible for the improvement in its light resistance. However, I wish to make it clear that I am not bound by this theory and that my process for improvement in the light resistance is successful regardless of the reason for such improvement and that it is this operative process which I wish to claim.

I claim:

1. In the process of making lithopone the steps which comprise calcining and quenching the crude lithopone, wet-grinding the quenched product, and subjecting the ground lithopone to the action of an acid solution.

2. In the process of making lithopone, the steps which comprise calcining and quenching the crude lithopone, grinding the quenched product, and subjecting the ground lithopone to the action of dilute sulphuric acid.

3. In the process of making lithopone the step which comprises treating the calcined, quenched, and ground lithopone with sufficient acid solution to dissolve a substantial part of the zinc oxide or basic zinc compounds present.

4. A process as set forth in claim 3 in which the acid solution is a dilute solution of an acid at least as strong as acetic acid.

5. A process as set forth in claim 3 in which the pigment, after being treated with the acid solution, is thoroughly washed to remove not only said acid solution but also any basic zinc compounds which have been dissolved.

6. In the process of making lithopone which includes the precipitation of crude lithopone, the calcination thereof, and the quenching, grinding and washing of the calcined product, the step which comprises treating the lithopone after any one of said operations with a reagent of acid reaction.

7. In the process of making lithopone which includes the precipitation of crude lithopone, the calcination thereof, and the quenching, grinding and washing of the calcined product, the step which comprises treating the lithopone after any one of said operations with a dilute aqueous solution of a reagent of acid reaction until a substantial part of the zinc oxide or basic zinc compounds present has been dissolved, and then removing the resulting solution from the pigment.

8. In the process of making lithopone of improved quality, the step which comprises treating the lithopone subsequent to the calcination thereof with a sufficient amount of an aqueous solution of a reagent of acid reaction to render water-soluble at least a major portion of the zinc oxide or basic zinc compounds present, and then washing the treated lithopone sufficiently to reduce the amount of water-soluble salts to a point not interfering with the use of the pigment in paint.

9. In the process of making lithopone, the steps which comprise treating the lithopone, subsequent to the calcination thereof, with an amount of a solution of a reagent of acid reaction sufficient to render water-soluble at least a part of the basic zinc compounds present and to reduce the content of the latter, calculated as zinc oxide, to less than 1%, and then washing the thus treated lithopone until the content of water-soluble salts has been reduced to less than 1%.

10. A process as set forth in claim 9 in which the content of basic zinc compounds is reduced to less than 0.5%.

11. A process as set forth in claim 9 in which the content of water soluble salts has been reduced to less than 0.5%.

12. A process as set forth in claim 9 in which the proportion of basis zinc compounds has been reduced to below 0.5% and the proportion of water-soluble salts has been reduced to less than 0.2%.

13. In the process of making lithopone, the steps which comprise treating the lithopone, subsequent to the calcination thereof, with an amount of a dilute solution of an acid sufficient to render water-soluble at least a part of the basic zinc compounds present and to reduce the content of the latter, calculated as zinc oxide, to less than 1%, and then washing the thus treated lithopone until the content of water-soluble salts has been reduced to less than 1%.

14. A process as set forth in claim 13 in which the content of water-soluble salts has been reduced to less than 0.5%.

15. A process as set forth in claim 9 in which the lithopone is treated with a solution containing a salt having an acid reaction.

16. A process as set forth in class 9 in which the lithopone is treated with a solution containing a normal salt having an acid reaction.

17. The process of making lithopone of improved quality which comprises calcining and quenching crude lithopone, grinding the quenched product, subjecting the ground lithopone to the action of a dilute solution of a strong mineral acid, and removing the water-soluble salts resulting from the acid-treatment.

18. The process of making lithopone of improved quality which comprises treating the lithopone, subsequent to the calcination thereof, with a dilute aqueous solution of a strong mineral acid, and removing water-soluble salts resulting from said acid-treatment.

In testimony whereof I affix my signature.
HERMAN G. SCHANCHE.